3,429,737
STYRENE POLYMER PARTICLES COATED WITH HYDROXY AMIDES
Peter D. Marsden, Dunscar, Bolton, England, assignor to Shell Oil Company, New York, N.Y., a corporation of Delaware
No Drawing. Filed Dec. 8, 1964, Ser. No. 416,875
U.S. Cl. 117—100    7 Claims
Int. Cl. C08f 45/60, 7/04

ABSTRACT OF THE DISCLOSURE

A particulate expandable polyvinyl aromatic composition wherein the separate particles are coated with a hydroxy amide having from 12 to 20 carbon atoms and the method of making and using such compositions.

---

The present invention relates to cellular polymeric material and to the production thereof. More particularly, the invention relates to coated expandable polyvinyl aromatic compositions, such as polystyrene and copolymers thereof, in particulate form and to their preparation; to the preparation of pre-expanded particles therefrom; and to the resulting pre-expanded particles and cellular material formed from said particles.

Specifically, the invention provides particulate expandable polyvinyl aromatic compositions coated with an aliphatic carboxylic acid amide having a hydroxy group in its molecule which can be pre-expanded by direct heat-treatment, e.g., contact with steam, without substantial fusion of the pre-expanded particles during said heat-treatment.

As is now well-known in the art, cellular polymeric material can be prepared from polyvinyl aromatic compounds, such as polystyrene or other polymers formed from one or more vinyl aromatic compounds or copolymers thereof. Cellular polymeric material can be made therefrom by first forming "expandable polymer particles," such as beads or nibs, containing a vaporizable expanding agent, such as n-butane, and preferably a normally-liquid expanding agent, such as technical pentane, which will cause expansion of the particles by vaporization when the particles are heated, thereafter pre-expanding the expandable polymer particles to form "pre-expanded particles," followed by a molding operation which results in a fusion of the pre-expanded particles to form a cellular material.

Pre-expansion of expandable polymer particles, irrespective of the particular way in which such particles are produced, can be accomplished by heat-treating a mass of the particles by direct contact with live steam in an enclosed vessel. This can be carried out in a batchwise operation in which a stirred mass of expandable particles is contacted with live steam or in a continuous manner by blowing live steam through a mass of the expandable particles in an elongated pre-expansion zone through which the particles move either in the same direction as or countercurrently to the steam.

A practical difficulty which arises when pre-expanding expandable particles by direct contact with steam, and particularly when the expanding agent is n-petane or technical pentane containing a major proportion of n-petane, is that the particles tend to clump together, i.e., fuse together, during the steam treatment. The result of this premature fusion is that it is difficult to handle the pre-expanded particles in the subsequent stages of forming the cellular polymeric material since free-flowing discrete pre-expanded particles, as distinct from clusters or agglomerates of particles, are required. It will be appreciated, however, that any special measure which is taken to avoid or at least to substantially reduce the premature fusion problem in the pre-expansion stage must not prevent fusion in the molding operation in which the cellular polymeric material is produced. Accordingly, two completely opposite requirements arise since fusion in the molding stage should be as complete as possible and ideally the cellular material should show on fracture substantially no indication of the individual pre-expanded particles from which it has been formed.

Expandable particles in the form of thermoplastic resinous beads have been treated in the past with a minor amount of perfluorooctanoic acid with the object of preventing the clumping together of the expanded particles. However, perfluorooctanoic acid is not a readily available chemical. Moreover, as will be understood by those in the art, any additional step in the manufacture of cellular polymeric material should for economic reasons add as little as possible to the overall manufacturing costs since cellular polymeric material is now widely used in large amounts for acoustic and thermal insulation purposes, as well as for the production of a wide variety of shaped articles.

Accordingly, it has been discovered that the problem of premature fusion occurring during the pre-expansion of particulate expandable polyvinyl aromatic compositions can be overcome or at least significantly reduced by coating the particles with a minor amount of an amide of a long chain aliphatic carboxylic acid which contains a hydroxy group in the molecule. A number of such amides are available commercially.

It is, therefore, the principal object of the invention to provide particulate expandable polyvinyl aromatic compositions which may be pre-expanded by direct contact with steam without substantial fusion of the pre-expanded particles during the steam treatment. It is a further object to provide a process for preparing cellular polymeric material wherein the pre-expanded particles are easily handled during the molding operations. These and other objects will become apparent to one skilled in the art from the following detailed disclosure and discussion.

These and other objects are accomplished by coating the external surfaces of a particulate expandable polyvinyl aromatic composition, such as polystyrene, with a minor proportion by weight of the particle of a $C_{12}$ to $C_{20}$ aliphatic carboxylic acid amide containing, in addition to the amide radical, a hydroxy group in its molecule. Preferably said particles are coated with 0.05 to 0.5%, and advantageously 0.1 to 0.2%, by weight thereof of said amide.

Such a particulate expandable polyvinyl aromatic composition can be manufactured by contacting particles of an expandable polyvinyl aromatic compound with a solution consisting of a carboxylic acid amide as just defined in an inert organic solvent therefor and subsequently removing said solvent under conditions in which a deposit or coating of said amide remains on the particle surface, i.e., vaporization of the solvent. Using a solution containing, for example 3 to 7%, e.g., about 5% by weight of said amide, it is readily possible to obtain a surface deposit comprising 0.05 to 0.5% by weight of the particle of said amide.

A pre-expanded particulate polyvinyl aromatic composition can be formed by subjecting such a particulate expandable polyvinyl aromatic composition to expansion conditions. The present invention, therefore, includes, not only the coated particulate expandable polyvinyl aromatic compositions, but also the resulting pre-expanded particulate polyvinyl aromatic compositions formed therefrom and cellular materials formed from the pre-expanded particles. Shaped articles comprising or consisting of said material may be produced from said pre-expanded particulate polyvinyl aromatic compositions by any known or suitable molding process involving fusion of the pre-expanded particles to form a cellular structure. Such fusion can be carried out in an enclosed mold which is substantially filled with the pre-expanded particles which, in accordance with conventional practice, have been allowed to age for some hours following pre-expansion. These particles are caused to fuse together by heat with little or no further expansion occurring in the mold itself.

The polyvinyl aromatic compounds suitable for use in the present invention include polystyrene, polymers of styrene and the halo and alkyl substituted polystyrenes, for example the nuclear or ring substituted polystyrenes, as well as the chain substituted polystyrenes. Examples of the substituted polystyrenes include, polyvinyl xylenes, polyvinyl toluenes, poly-alpha-methylstyrene and polychlorostyrene. As used in this specification, polymers of styrene denotes polystyrene and monomer mixtures comprising a major proportion of styrene, generally at least 60–75% styrene, and a minor proportion, typically less than 25%, of an olefinically unsaturated comonomer, such as ethylacrylate, methylmethacrylate, acrylonitrile, methylstyrene and others. For ease of description, reference hereinafter will be made to polystyrene. It will be understood, however, that the invention is not limited thereto.

The required expandable polystyrene particles can be prepared in many ways from beads or pearls as produced by suspension or emulsion polymerization and from nibs or granules produced from polystyrene which has been manufactured in or processed into a nonparticulate form. For example, a vaporizable expanding agent can be incorporated in polystyrene particles by treating an aqueous suspension of the particles with an expanding agent, such as pentane, either as a separate step following production of the particles or, in the case of polystyrene produced by emulsion or suspension polymerization, by introducing the expanding agent into the polymerization reactor after completion or towards the end of the polymerization. Another way of preparing expandable polystyrene particles comprises incorporating an expanding agent into a heat-plastified mass of polystyrene in an extruder and comminuting the resulting extrudate. It is to be understood, therefore, that the present invention is in no way limited to the way in which the volatile expanding agent is introduced into the particulate polyvinyl aromatic compound. It will be evident from the foregoing discussion that as used herein the term "expandable particle" signifies a particle of polyvinyl aromatic compound which has incorporated therein a vaporizable expanding agent and which is capable of expansion to many times its original volume. The term "pre-expanded particle" signifies such a particle after it has been expanded. In practice expandable particles are usually supplied to the plastics molding industry and the latter carry out the necessary pre-expansion prior to the molding operation in which cellular articles are produced by fusion of pre-expanded particles in a mold.

U.S. Patent No. 2,989,782 describes a method of improving the strength of molded cellular polystyrene articles by coating expandable, i.e., foamable, polystyrene particles with less than 2.0% by weight of the particle of an organic compound which boils above 100° C. at normal pressure and is soluble in the polystyrene. Such a compound is described therein as a compatible organic compound. It is clear from U.S. Patent No. 2,989,782 that the organic compound dissolves or disperses in the surface shell of the polystyrene particles and acts as a fusion promoter in the subsequent molding operation. In contrast the additives used in carrying out the present invention act in quite the opposite sense in the pre-expansion stage and yet, surprisingly, their use has no deleterious effect on the fusion which takes place during molding.

The amide used in carrying out the present invention preferably has a melting point which is below, and preferably at least 5 to 10° C. below, the fusion temperature employed in the molding process in which the ultimate cellular material is formed.

Preferred aliphatic carboxylic acid amides which contain a hydroxyl group in its molecule are the amides of the $C_{12}$ to $C_{20}$ aliphatic carboxylic acids, and particularly preferred are the $C_{12}$ to $C_{20}$ paraffinic and olefinic carboxylic acids. Examples of the amides include ricinoleamide (12-hydroxyoleamide) and 12-hydroxystearamide; however, other hydroxyl-containing aliphatic carboxylic acid amides, such as 9,10-dihydroxystearamide.

Although the amides of the $C_{12}$ to $C_{20}$ aliphatic hydroxy acids, such as for example, ricinoleamide are at present particularly preferred, other suitable hydroxy group-containing amides include those in which the hydroxy group forms part of an alkylol radical, such as methylol stearamide, or an oxyalkylene radical, such as an alkylene oxide, for example ethylene oxide, condensates of hydroxy amides, which condensate contain an oxyalkylene radical having a terminal hydroxy group. Hydroxy derivatives of polyamides, such as methylene distearamide and ethylene distearamide, are also included. For cost and availability reasons, however, the hydroxy-substituted long chain aliphatic monoamides are usually preferred.

Since the problem of premature fusion during pre-expansion appears to be one involving the particle surfaces, the expandable particles of the present invention are prepared in a manner so as to provide a deposit in the form of an adherent surface layer or coating on at least a major proportion of the particle surfaces. The deposit consists of a minor proportion, calculated by weight of the particle, of a carboxylic acid amide containing a hydroxy group in its molecule. Usually about 0.1 to 0.2% by weight of the particle of said amide is sufficient. In the case of polystyrene good results have been obtained using particles consisting of about 0.1 to about 0.15% by weight of the particle of an hydroxy aliphatic carboxylic acid amide. In some cases more than 0.5% of the amide can be used if desired, although it is not usually necessary, and in fact the need for adequate fusion in the molding stage may place a practical limitation on the amount used.

Advantageously, the particulate expandable polyvinyl aromatic compound is coated with said amide by employing a solution thereof and this can be carried out by contacting, for example by drip-feeding onto or spraying, the particles with a solution of the amide in an organic solvent which is inert with respect to the amide and the polyvinyl aromatic compound, such as an aliphatic alcohol, for example methanol, ethanol, isopropanol, or an aliphatic hydrocarbon, such as hexane, heptane, cyclopentane or petroleum ether, or a chlorinated aliphatic hydrocarbon, an ester or a ketone. A relatively dilute solution of the amide in the solvent, in the order of about 3 to 5% by weight, is usually sufficient. After the particles have been contacted with the solution, they can be dried to remove the solvent in any convenient manner, for example by the use of a flash drier.

For example in the case of particulate expandable polystyrene in the form of expandable beads produced by a suspension polymerization process, the beads, after centrifuging to remove water may be fed, via a conveyor screw to which a solution of the selected amide in a lower aliphatic alcohol is drip-fed, to a flash drier in which the alcohol and any remaining water are removed. It is, however, also possible to pass the beads from the centrifuge through a hopper or mixer, if desired on a conveyor belt, in which they are sprayed with amide solution, or alternatively to pass the beads through a bath comprising the amide solution. Although in general addition of the amide may be advantageously carried out by contacting expandable particles with a solution thereof, the addition of the amide to the polymerization reactor in the case of emulsion or suspension polymerization techniques, either initially or during polymerization, is not excluded. It is also possible in the case of expandable particles formed from particles such as beads or nibs of polyvinyl aromatic compound, to add the amide to the expanding agent, but preferably during the latter part of the operation in which the expanding agent is incorporated in the particulate polyvinyl aromatic compound, i.e., when an appreciable quantity of the expanding agents has already been taken up by the polyvinyl aromatic compound so as to insure that most of the additive is deposited on the particle surface.

One convenient way of carrying out the process of the present invention comprises passing an expandable polystyrene in bead form and containing pentane as the expanding agent upwardly through an upwardly inclined screw conveyor containing at its lower end a solution of an hydroxy amide in ethanol. Conveniently, the solution occupies about one-third of the volume of the conveyor and provisions may easily be made for maintaining a constant head of solution therein. The remaining two-thirds of the conveyor then forms a draining section for the beads which, after so draining, are discharged from the top end of the conveyor into a flash drier. In operation the amides solution can contain, for example 3 to 6%, e.g., about 5%, of the amide and conditions can be so arranged as to give a coating of about 0.1 to 0.2% by weight based on the weight of the bead, e.g., about 0.15%, of amide on the bead surface after removal of the alcohol.

It will be understood that in practice in referring to the amount of amide deposited as an adherent layer or coating on the particle surface the percentage figures quoted can be applied on an average basis, i.e., the average amount of amide associated with a mass of particles (a pound weight thereof), for ease of control on the plant scale. In such case individual particles can of course be expected to have somewhat greater or lesser amounts of amide associated therewith than the percentage average amount depending on the size of the particle.

The present invention may be further illustrated by the following examples:

EXAMPLE I

An expandable polystyrene in bead form and containing technical pentane as the expanding agent is passed through a screw conveyor in which it is contacted with sufficient amount of a 5% solution of 12-hydroxyoleamide in ethanol (industrial methylated spirit) to form, on removing the ethanol, a coating of 0.15% (by weight of the beads on an average basis) of 12-hydroxyoleamide on the external surface of the beads. The beads after contact with the amide solution are discharged from the conveyor into a flash drier.

The treated beads are then pre-expanded in an unstirred batch pre-expander by direct contact with live steam to simulate the most critical conditions, from the point of view of premature fusion, likely to be found in practice. It is found that the treated beads are entirely satisfactory in that no agglomeration occurred during pre-expansion and the beads are free-flowing in all respects.

The pre-expanded beads are then molded into blocks in steam heated enclosed molds in accordance with conventional practice and it was found that the beads fused well and produced good moldings. By way of comparison similar beads which had not been treated with ricinoleamide in the manner indicated were pre-expanded under identical conditions and it was found that appreciable agglomeration or clumping together occurred due to premature fushion in the pre-expander.

EXAMPLE II

By the way of further comparison the expandable polystyrene beads of Example I are treated with a 5% solution of oleamide and lauramide in ethanol, respectively, by the method described in Example I. However, on pre-expansion under identical conditions it is found that appreciable agglomeration occurred. By way of further comparison repetition of this example using methyl 12-hydroxy stearate and methyl 12-hydroxyoleate, respectively, in place of oleamide or lauramide gave similar results, thus illustrating that the effectiveness of the treatment using a hydroxy amide in accordance with the present invention depends on the presence on the surfaces of the particle of an amide having the hydroxy group in its molecular structure. It is also believed that the long chain carboxylic acid amide additive has the inherent ability to adhere to some extent to the particle surface and to resist accidental removal, with consequent loss of effectiveness, during transport or storage which might otherwise occur if an additive having no such tendency to adhere to the particle surface were simply dusted on the particle surface. For the same reason it is at present considered advantageous to deposit the amide additive on the particle surface from a solution of the amide (either in a separate solvent or in the expanding agent), although as previously indicated other methods of application are not excluded.

EXAMPLES III AND IV

The procedure of Example I is repeated with the exception that equivalent amounts of 12-hydroxystearamide and 9,10-dihydroxystearamide, respectively, were used in place of 12-hydroxyoleamide. Similar results were obtained.

I claim as my invention:

1. A free-flowing composition comprising discrete particles of a foamable styrene polymer, normally susceptible to clumping into aggregates of a plurality of said particles adhered to one another upon expanding by heating, and having on the surfaces of said particles an antisticking coating consisting essentially of 0.05–0.5% by weight of an amide of a $C_{12-20}$ aliphatic hydroxy monocarboxylic acid.

2. A particulate expandable polystyrene according to claim 1 wherein the polymer is polystyrene, and the particles bear 0.1–0.2% by weight of 12-hydroxystearamide the antisticking coating.

3. A particulate expandable polystyrene according to claim 1 wherein the polymer is polystyrene, and the particles bear 0.1–0.2% by weight of 12-hydroxystearamide as the antisticking coating.

4. A composition according to claim 1 wherein the polymer is polystyrene.

5. A coated composition as defined in claim 4 wherein said coating is present on the surface of each particle in an amount varying from about 0.1% to about 0.2% by weight based on the weight of said particle.

6. A coated composition as defined in claim 4 wherein said compound is 12-hydroxyoleamide.

7. A coated composition as defined in claim 4 wherein said compound is 12-hydroxystearamide.

References Cited

UNITED STATES PATENTS

| | | | |
|---|---|---|---|
| 2,684,969 | 7/1954 | Krems et al. | 260—404 |
| 2,773,852 | 12/1956 | Rowe et al. | 260—404 X |
| 2,911,381 | 11/1959 | Roth | 260—2.5 |
| 2,989,782 | 6/1961 | Barkhuff et al. | 117—100 X |
| 3,056,752 | 10/1962 | Zweigle | 117—100 |
| 3,086,885 | 4/1963 | Jahn | 260—2.5 X |

WILLIAM D. MARTIN, *Primary Examiner.*

U.S. Cl. X.R.

117—138.8, 167; 260—2.5